United States Patent [19]
Seltzer et al.

[11] 3,960,783
[45] June 1, 1976

[54] NOVEL POLYMERS FROM S-TRIAZINE CYANAMIDE COMPOUNDS

[75] Inventors: Raymond Seltzer, New City; Paul D. Sherman, Shrub Oak, both of N.Y.

[73] Assignee: Ciba-Geigy Corporation, Ardsley, N.Y.

[22] Filed: Apr. 1, 1974

[21] Appl. No.: 456,916

[52] U.S. Cl. .............................. 260/2 R; 260/47 R; 260/79.7; 260/248 CS
[51] Int. Cl.² ......................................... C08G 73/06
[58] Field of Search ............ 260/47 R, 2 R, 248 CS, 260/79.7, 85.5 A, 80.72

[56] References Cited
UNITED STATES PATENTS

| | | | |
|---|---|---|---|
| 3,053,796 | 9/1962 | Schnelzer et al.............. | 260/248 CS |
| 3,277,091 | 10/1966 | D'Alelio....................... | 260/248 CS |
| 3,308,101 | 3/1967 | Ikeda............................ | 260/78.4 R |
| 3,654,192 | 4/1972 | Vogel............................ | 260/2 R |

*Primary Examiner*—Joseph L. Schofer
*Assistant Examiner*—Peter F. Kulkosky
*Attorney, Agent, or Firm*—Charles W. Vanecek

[57] ABSTRACT

Polymers are provided by the reaction of s-triazine cyanamides and mono- or polyfunctional phenols, cyanuric acids, thiols or amines. The amine, thiol, cyanuric acid or phenol radicals may be on the triazine molecule in which case the product is a homopolymer or on different compounds in which case copolymers are obtained.

37 Claims, No Drawings

NOVEL POLYMERS FROM S-TRIAZINE CYANAMIDE COMPOUNDS

This invention relates to a new class of polymers. It relates further to polymers prepared by the addition polymerization of s-triazine cyanamides with mono- and poly-functional amines, phenols, thiols and cyanuric acids.

The new polymers of the present invention can be represented by the following formula (I):

$$\left(N \equiv C - \underset{|}{N}\right)_d \left[ B_b - \underset{N}{\overset{C_c}{\underset{\|}{\bigwedge}}}_N \left(-\underset{|}{N}-\overset{R'}{\underset{\|}{C}}-\right)_a \right]_m (X-Q-A_y)_n - (H)_e$$

wherein
y = 0, 1, 2, 3 or 4
a = 1, 2 or 3
b = 0, 1 or 2
c = 0, 1 or 2
a+b+c = 3
m = 1 to 100
n = 0 to 100, provided that when b+c=0, n is a positive number and when n is 0, at least one of C and B must be "X—Q—A$_y$"
X = nil, —O—, —S—, —NH—, —NR—, H
A = —O—, —S—, —NH—, —NR—
Q = an organic radical, e.g., arylene, alkylene and/or heterocyclic
R = alkyl, aryl or heterocyclic
R' = a recurring amidinotriazinyl moiety (s-triazine—NR—C(=N—)—) from the triazine starting material) or H
B = —X—Q—A$_y$—, X or —NR—C(=N—)—
C = —X—Q—A$_y$—, X, XH or —NR—C(=N—)—
d = number of unreacted $$R-\underset{|}{N}-CN$$

groups
e = number of unreacted hydrogen containing functional groups

In the foregoing definitions:
"aryl" is intended to mean a carbocyclic radical of 1–3 condensed or separate 6-carbon rings such as phenyl, naphthyl, terphenyl, phenanthryl. These rings may bear one or more, preferably up to three non-interferring substitutents such as lower alkyl, lower alkoxy, halogen (e.g., bromo, chloro or fluoro) or nitro, or an R" substituent of the formula:

$$-X'-\bigcirc$$

wherein X' is a single bond, O, S, NH, SO$_2$, lower alkylene, carbonyl, lower alkylidene,
"alkyl" is intended to mean alkyl of 1–18, preferably, 1–7 carbons such as methyl, ethyl and propyl which may bear substituents non-interferring such as alkoxy, thioalkoxy, nitro and aryl of 1–3 rings as defined above; and "heterocyclic" is intended to mean 5- or 6-membered rings containing carbon and heteroatoms of the group consisting of oxygen, sulfur and/or nitrogen, such rings being exemplified by thiadiazole, imidazole, oxazole, thiazine pyridine, pyrimidine, pyrrole, pyrone, furan, triazine, etc.

The polymers of formula I can be prepared by the reaction of a cyanamide of a secondary amine s-triazine of the formula (II):

$$B_b - \overset{C_c}{\underset{N}{\bigwedge}}_N (N-CN)_a \quad \overset{R}{\underset{|}{}}$$

wherein B, C, R, a, b and c are defined above, with a monofunctional or polyfinctional amine, thiol, phenol or cyanuric acid of the formula (III):

$$HX-Q-AH_y$$

wherein X, Q, A and y are as defined above. The amine, thiol, phenol or cyanuric acid reactants may have any number of non-interferring substituents, i.e., substituents which do not react with said cyano, amine, thiol or hydroxy groups, but must be free of interferring substituents, i.e., substituents which react with amine, phenol, thio or cyano groups. Examples of non-interferring groups are alkyl, aryl, heterocyclic, nitro, sulfone, sulfoxide, acyl, ether, alcoholic hydroxy, thioether and tertiary amine groups. Examples of interferring groups are acyloxy, acyl halide, carboxy, SO$_3$H, PO$_3$H, PO$_4$H$_2$, and isocyanate. To determine whether a substituent group not named above is interferring with respect to the reaction between the triazine cyanamide and the mono- or polyfunctional compound of formula III, a sample of a compound with such a substituent group can be admixed with each of the reactants and the mixture (in a solvent) heated to reflux for a period of time chosen to represent actual reaction conditions. If analysis of the reaction products from such test reaction shows absence of amidine groups and substituent groups, then it can be concluded that the latter are interferring, and should not be present on any of the reactant triazine and functional compounds.

The polymerization of the present invention proceeds through two primary routes shown by the following partial equations, wherein "T" represents an s-triazine ring:

Equation 1

Reaction of cyanamide and active hydrogen moieties:

$$\underset{|}{\overset{R}{>T-N-C\equiv N}} + HX-Q-AH$$
$$\downarrow$$
$$\underset{|}{\overset{R}{>T-N}}-\underset{\|}{\overset{NH}{C}}-X-Q-A-\underset{\|}{\overset{NH}{C}}-\underset{|}{\overset{R}{N}}-T<$$

Equation 2

Reaction of amidine and cyanamide moieties:

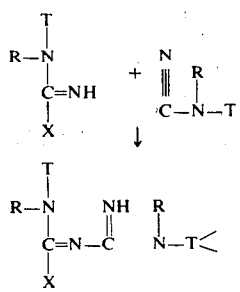

In Equation 1 the cyanamide moiety attached to the triazine reacts with functional groups "—XH—" and "—AH—" to yield an amidine radical

The imino group on the amidine radical has an active hydrogen which can in turn react with a cyano group, yielding another imino group as shown in Equation 2. Thus, since each time a cyano group reacts, it produces another reactive site, polymerization can proceed with monofunctional triazine cyanamides and monofunctional thiols, phenols, cyanuric acids and amines.

The polymerization described in this invention is complex, but the resulting polymer can be best represented by idealized formula I. However, it should be understood that other reactions may occur, and the polymer may contain moieties not shown in formula I, e.g., heterocyclic nitrogen containing rings.

Triazine cyanamides which are useful as monomers in the present invention are represented by formula II and exemplified by the following:

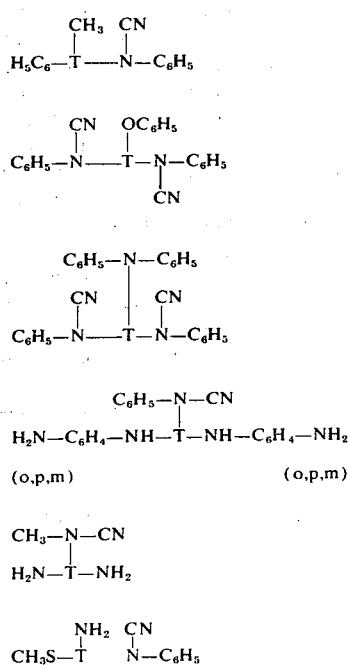

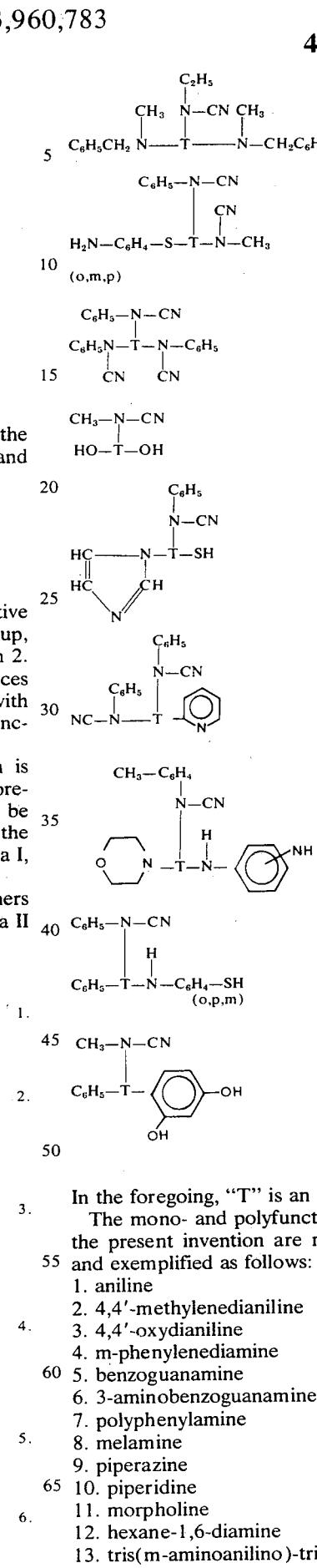

In the foregoing, "T" is an s-triazinyl radical.

The mono- and polyfunctional compounds useful in the present invention are represented by formula III and exemplified as follows:
1. aniline
2. 4,4'-methylenedianiline
3. 4,4'-oxydianiline
4. m-phenylenediamine
5. benzoguanamine
6. 3-aminobenzoguanamine
7. polyphenylamine
8. melamine
9. piperazine
10. piperidine
11. morpholine
12. hexane-1,6-diamine
13. tris(m-aminoanilino)-triazine 14. 3,3',4,4'-tetraamino diphenyl ether
15. p-aminophenol
16. p-aminothiophenol
17. 2-aminopyridine
18. β-hydroxyethylamine
19. 4-amino-α-naphthol
20. phenol
21. resorcinol
22. bis-phenol A
23. cyanuric acid
24. 1,4-butane dithiol
25. toluene-3,4-dithiol
26. thiophenol
27. p-chlorothiophenol
28. 4-methyl-1-mercaptonaphthalene The triazine cyanamide and mono- or polyfunctional compound can be reacted at an elevated temperature in the range of about 75° – 250°C. in the presence or absence of a solvent. In the absence of a solvent, the temperature is preferably sufficiently elevated to assure that the reactants are in a molten condition. In the presence of a solvent, the temperature can be maintained at reflux.

The molar ratio of triazine cyanamide to the functional compound can vary widely since each can have either one or a plurality of functionalities and also the reaction of each cyanamide radical produces another reactive moiety. A preferred numerical ratio would be 10:1 to 1:5 of triazine cyanamide to mono- or polyfunctional compounds. This range can be expanded to 30:1 to 1:10 if desired.

After the polymer has been formed it can be subjected to a post-cure treatment involving allowing the polymer to stand for a period of several hours to several days at elevated temperatures in the range of 50°–350°C. whereby reactive groups are allowed to react with each other giving a stronger, more highly cross-linked material.

The polymers of the present invention may be used as molding powders, laminating resins and adhesives. The polymers have varying properties (i.e., they may be solids, rubbers or viscous liquids), depending upon the structure of the amine, phenol, cyanuric acid or thiol, the mole ratio and the polymerization temperature.

The following examples are presented to further illustrate this invention. Temperatures are in Centigrade unless otherwise stated.

EXAMPLE 1

Synthesis of Triazine Cyanamides

A. Tris-(N-Cyanoanilino)-s-Triazine (TNCT)

A solution of 9.20g (0.05 mole) of cyanuric chloride in 100 ml of dioxane was added to 100 ml of ice water. To this mixture at room temperature was added dropwise a solution of 0.15 mole of sodium phenylcyanamide in 70 ml of water over a 30 minute period. After stirring for 3 hours at room temperature, the reaction mixture was refluxed for 16 hours. After cooling to room temperature the reaction mixture was filtered. The residue was washed with water and dried to give 17.2g (80%) of of TNCT, m.p. 209°–215°. Recrystallization from toluene gave 10.8g with an m.p. of 215°–218°.

Anal. Calcd. for $C_{24}H_{15}N_9$: C, 67.12; H, 3.52; N, 29.35. Found: C, 66.42; H, 3.65; N, 28.95.

B. 2-Diphenylamino-4,6-Bis(N-Cyanoanilino)-s-Triazine (DPNCT)

To a solution of 31.7g (0.10 mole) of a 2-diphenylamino-4,6-dichloro-s-triazine in 325 ml of acetone at room temperature was added dropwise to a solution of 0.20 mole of sodium phenylcyanamide in 100 ml of water over a 30 minute period. After stirring for 1 hour at room temperature, the reaction mixture was heated at reflux overnight. After cooling the reaction mixture was filtered. The residue was washed with water, acetone and dried to give 25.5g of crude product. Recrystallization from 1500 ml of acetonitrile gave 20.9g of pure DPNCT, m.p. 280°–284°.

Anal. Calcd. for $C_{29}H_{20}N_8$: C, 72.48; H, 4.20; N, 23.32. Found: C, 72.39; H, 4.24; N, 23.36.

C. 2-N-Cyanoanilino-4,6-Bis(m-Aminoanilino)-s-Triazine (NCAAT)

To a solution of 54.0g (0.50 mole) of m-phenylenediamine in 100 ml of dioxane was added 10.6g (0.10 mole) of sodium carbonate. The mixture was heated to reflux and a solution of 13.3g (0.05 mole) of 2-N-cyanoanilino-4,6-dichloro-s-triazine in 75 ml of dioxane was added dropwise over a 5 hour period. The reaction mixture was then refluxed overnight. After cooling to room temperature, the reaction mixture was filtered. The filtrate was stripped to dryness. The oily residue was added to ice water. The resulting solid was filtered, washed with water and dried to give 20.2g. Recrystallization from i-propanol gave 9.5g, m.p. 107.

Anal. Calcd. for $C_{22}H_{19}N_9$: C, 64.50; H, 4.67; N, 30.83. Found: C, 63.55; H, 4.99; N, 29.97.

EXAMPLE 2

TNCT and 4,4'-methylenedianiline were reacted in various mole ratios and at different cure temperatures, for varying lengths of time. The Tg's and melting points of the resultant materials were measured and are reported below.

Effect of the Mole Ratio of TNCT:MDA (Methylenedianiline) on Tg, Cure Time and Melting Point

| TNCT:MDA (Mole Ratio) | Tg 200°* | Tg 300°* | Gel Time 200°C. | Melting Points |
|---|---|---|---|---|
| 9:1 | 160 | 330 | 3 hrs. | 150–160 after heating for 1 hr. at 200° |
| 9:2 | 182 | 312 | 1.5 hrs. | 160–170 after heating for 15 min. at 200° |
| 9:3 | 173 | 270 | 20 min. | 165–175 after 1 min. at 200° |
| 9:4 | 195 | 265 | 15 min. | 160–175 after 1 min. at 200° |
| 9:9 | >200 | 250 | 5 min. | 90–150 (dry blend of MDA and TNCT) |
| 2:3 (stoichiometric) | 205 | 250–260 | 5 min. | — |

*Temperature at which polymer is cured.

EXAMPLE 3

TNCT was reacted with m-phenylenediamine in various molar ratios and at different cure temperatures. The glass transition temperature and cure times of the resulting polymers are reported below.

| TNCT:MPDA Mole Ratio | Effect of the Mole Ratio of TNCT:MPDA (m-phenylenediamine) On Tg and Cure Times | | |
|---|---|---|---|
| | Tg 200°* | Tg 300°* | Cure Time 200°* |
| 9:1 | — | — | 3–4 hrs. |
| 9:2 | 170 | 280 | 2 hrs. |
| 9:3 | 170 | 270 | — |
| 9:4 | 187 | 260 | 10 min. |

*Temperature at which polymer is cured.

EXAMPLE 4

Several polymers using different mole ratios of TNCT and resorcinol were prepared. Their properties are reported below.

| TNCT:Resorcinol Mole Ratio | Effect of the Mole Ratio of TNCT:Resorcinol of Tg, Cure Time and Melting Point | | | |
|---|---|---|---|---|
| | Tg 200°c) | Tg 300°c) | Cure Time 200°c) | Melting Point |
| 9:1 | 170 | 300 | 4 hrs. | 160–170a) |
| 9:2 | 150–160 | 300 | 1.5 hrs. | 145–160b) |
| 9:3 | 175 | 275 | — | — |
| 9:4 | 160–165 | 295 | 45 min. | 130–145b) | a)After heating for 2.5 hrs. at 200°
b)Dry blend of TNCT and resorcinol
c)Cure temperature of polymer

EXAMPLE 5

The solubilities of various polymers of this invention in common solvents is reported below.

| Mole Ratio | Solubilities |
|---|---|
| TNCT-ABGa) | 20 weight percent in methyl cellosolve after heating equimolar mixture at 175° until molten and then cooling. |
| 9TNCT:MDA | 50% in methylethyl ketone (MEK) after heating at 200° for 1 hour. |
| 9TNCT:2MDA | 50% in MEK (DMF) after heating at 200° for 15 minutes. |
| 9TNCT:4MDA | 20% MEK (40% DMF) after heating at 170° until molten. |
| TNCT:PPAb) | 50% MEK, acetone, dioxane, methyl cellosolve after heating to 125° until molten and then cooled. |
| 9TNCT:2MPDA | 20% in MEK after heating at 200° until molten. |
| 9TNCT:4MPDA | 20% in MEK after heating at 200° until molten. |
| 9TNCT:Resorcinol | 50% MEK, 40% DMF after heating at 200° for 2.5 hrs. |
| 9TNCT:2 Resorcinol | 20% MEK after heating at 200° until molten. |
| 9TNCT:4 Resorcinol | 20% MEK after heating at 200° until molten. | a)ABG = 3-aminobenzoguanamine
b)"PPA" is the compound of the formula:

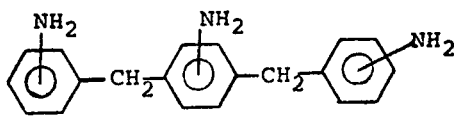

EXAMPLE 6

An equimolar mixture of TNCT and PPA was heated. At 130°–140° the mixture became molten and set up to a hard glassy solid after 5 minutes at 140°.

EXAMPLE 7

Laminating Varnish

An equimolar mixture of TNCT and MDA was heated to 125°–130°. After the mixture was molten it was dissolved in MEK to give a 50 weight percent varnish. The varnish was used to prepreg 181E glass cloth (A1100 finish). The prepreg was cut up into 6 × 6 inch plies. A twelve ply laminate was prepared by B-staging at 80° for 30 minutes followed by 1 hour at 177°C./200 psi. The laminate was then postcured from room temperature to 235° over an 8 hour period.

Flexural Strength = 42,000 psi
Flexural Modulus = 2.62 × $10^6$ psi

EXAMPLE 8

An equimolar mixture of TNCT and tris-(m-aminoanilino)-s-triazine melted at 150°–170° followed by the formation of a hard, glassy polymer at 175°–180°.

EXAMPLE 9

TNCT and 3,3',4,4'-Tetraamino Diphenyl Ether

A mixture of TNCT and 3,3',4,4'-tetraamino diphenyl ether in a mole ratio of 4:3 respectively melted at 150°–175° followed by immediate formation of a hard orange polymer.

EXAMPLE 10

TNCT and 3-Aminobenzoguanamine

An equimolar mixture of TNCT and ABG melted at 180° followed by rapid reaction with the formation of a hard, orange polymer.

EXAMPLE 11

A mixture of TNCT and MDA in a mole ratio of 9:1 was placed in an oil bath at 200°. After 3.5 hours, the mixture was set up to a hard polymer.

EXAMPLE 12

Molding Powder

A mixture of 271g (0.63 mole) of TNCT and 13.8g (0.07 mole) of MDA was wet blended in hexane with a Waring Blender. The powder was heated under vacuum at 80° for 30 minutes followed by 3 hours at 200° in a circulating air oven. The material was pulverized and then dry blended with 50 weight percent of powdered quartz. This mixture was molded at 500°F./3000 psi to give a ¼ inch void free plaque.
Flexural Strength = 2650 psi
Flexural Modulus = 1.37 × $10^6$ psi

EXAMPLE 13

A mixture of TNCT and MDA in a mole ratio of 9:2 set up to a hard polymer in 1.5 hours at 200°.

EXAMPLE 14

A molar mixture of 9 TNCT and 3 MDA melted at 90°–160° and it formed a hard resin in 1 hour at 200°.

EXAMPLE 15

A molar mixture of 9 TNCT:4 MDA cured in 15–20 minutes at 200° to a hard polymer.

EXAMPLE 16

An equimolar mixture of TNCT and MDA melted at 90°–150° followed by polymer formation at 160° in 5 minutes.

EXAMPLE 17

Laminating Varnish

A mixture of 360.0g (0.84 mole) of TNCT and 165.1g (0.84 mole) of MDA were wet blended with hexane. After filtration, the powder was heated at 120° for 1 hour. The material was then dissolved in MEK to give a 50 weight percent solution. This varnish was used to prepreg 181E glass cloth (A1100 finish). The prepreg had a resin content of 37%. It was cut into 6 × 6 inch plies. A twelve ply laminate was prepared by B-staging at 260°F. for 1 hour followed by 2 hours at 350°F./90 psi.

EXAMPLE 18

A molar mixture of 2 TNCT:3 MDA melted at 170° and then reacted at 170°–180° to give a hard, glassy polymer.

EXAMPLE 19

An equimolar mixture of ODA* and TNCT polymerized at 190° to a hard, transparent resin.
* oxydianiline

EXAMPLE 20

A molar mixture of 2 TNCT:3 ODA melted at 170° and then polymerized to a hard, glassy resin at 170°–180°.

EXAMPLE 21

An equimolar mixture of TNCT and BG (benzoguanamine) melted at 210° and formed a hard polymer at 210° in 1.5 hours.

EXAMPLE 22

A molar mixture of 2 TNCT:3 BG melted at 200°–210° and polymerized to an orange resin at 215°.

EXAMPLE 23

A mixture of TNCT and aniline in a mole ratio of 9:2 respectively polymerized to a hard polymer at 200° in 3–4 hours.

EXAMPLE 24

A molar mixture of 9 TNCT:4 melamine melted at 215°–222° and reacted to form a rubber in 10–15 minutes.

EXAMPLE 25

A molar mixture of 2 TNCT:3 MPDA (m-phenylenediamine) melted at 120° and then formed a hard, glassy polymer at 185°–200° in 30 minutes.

EXAMPLE 26

A molar mixture of 9 TNCT:MPDA cured to an orange polymer in 3–4 hours at 200°. Molar mixtures of 9 TNCT:2 MPDA and 9 TNCT:4 MPDA cured at 200° in 2 hours and 10 minutes respectively.

EXAMPLE 27

A 5:1 molar mixture of TNCT and hexane-1,6-diamine polymerized to a syrupy material at 100°. Further heating at 200° gave a rubbery resin.

EXAMPLE 28

A molar mixture of 9 TNCT:2 phenol polymerized to a hard rubber in 6 hours at 200°.

EXAMPLE 29

A molar mixture of 9 TNCT:1 resorcinol melted and then solidified to a hard polymer at 200° in 4 hours.

EXAMPLE 30

A molar mixture of 2 TNCT:3 resorcinol melted at 130°. Heating for 5 hours at 200° gave a rubbery polymer.

EXAMPLE 31

A molar mixture of 9 TNCT:2 resorcinol cured at 200° in 1.5 hours to a glassy polymer.

EXAMPLE 32

A molar mixture of 9 TNCT:4 resorcinol reacted at 200° in 45 minutes to a hard polymer.

EXAMPLE 33

A molar mixture of 2 TNCT:3-bis-phenol A melted at 140°–165° followed by an increase in melt viscosity at 170°. After 1 hour at 200° a hard polymer was formed.

EXAMPLE 34

A molar mixture of 9 TNCT:4 cyanuric acid was heated at 230°. After 3 hours it solidified to a hard, orange polymer.

EXAMPLE 35

A 9:2 molar mixture of TNCT and thiophenol melted at 190°. Heating for 4 hours at 200° gave a syrupy polymer.

EXAMPLE 36

A stoichiometric mixture of TNCT and toluene-3,4-dithiol melted at 90° and then reacted to give a dark colored viscous liquid. Heating at 200° gave a syrupy polymer on cooling. The syrup solidified to a glassy polymer at 160°.

EXAMPLE 37

A stoichiometric mixture of TNCT and 1,4-butane dithiol melted at 170° to give a dark viscous melt. After heating for 2 hours at 200°, the polymer was cooled. At 120° the melt solidified to a glassy polymer.

EXAMPLE 38

An equimolar mixture of DPNCT and ODA polymerized to a rubbery resin after heating for 2 hours at 225°.

EXAMPLE 39

A molar mixture of 2 PPA:3 DPNCT melted at 150°–190° and formed a hard polymer after 1.5 hours at 200°.

EXAMPLE 40

A molar mixture of 3 DPNCT:2 ABG melted at 150° – 170° and then solidified to a hard polymer at 175° – 180°.

EXAMPLE 41

An equimolar mixture of MDA and DPNCT melted at 155°. Heating for 2.5 hours at 200° gave a rubbery polymer.

EXAMPLE 42

A molar mixture of 9 DPNCT:4 bis-phenol A is reacted at 200° to give a hard polymer.

EXAMPLE 43

An equimolar mixture of DPNCT and toluene-3,4-dithiol is reacted at 200° to give a rubbery polymer.

EXAMPLE 44

Homopolymerization of NCAAT

A sample of NCAAT melted at 120° – 140° and solidified to a hard, glassy polymer at 180° – 200° in 15 minutes.

EXAMPLE 45

Polymerization of 3 NCAAT:2 BTDA Imidized Prepolymer

To a solution of 0.015 mole of NCAAT in 28g of DMF was added 0.010 mole of BTDA* in these portions over a 20 minute period. After stirring overnight at room temperature the amic acid was imidized by heating at 175° for 3 hours. After cooling, the imidized prepolymer remained in solution. (A sample of prepolymer was isolated by precipitation with acetone. After drying it was also soluble in NMP, DMAc and DMSO). The DMF solution of the amine terminated, imidized

* BTDA = Benzophenone Tetracarboxylic Acid Dianhydride prepolymer was cast on an aluminum sheet.

A flexible film was obtained by curing from room temperature to 300° over a 1 hour period followed by 1 hour at 300°.

EXAMPLE 46

A mixture of TNCT and piperazine in a mole ratio of 9:4 respectively is heated at 200° to give a hard, glassy polymer.

EXAMPLE 47

An equimolar mixture of DPNCT and piperazine is heated at 175° to a rubbery polymer.

EXAMPLE 48

A mixture of TNCT and piperidine in a mole ratio of 9:2 respectively is heated at 200° to give a hard polymer.

EXAMPLE 49

A mixture of 2-(2'-pyridinyl-)-4,6-bis-(N-cyanoanilino)-s-triazine and piperazine in a mole of 9:4 respectively is heated at 200° to give a hard polymer.

EXAMPLE 50

An equimolar mixture of 2-(2'-pyridinyl)-4,6-bis-(N-cyanoanilino)-s-triazine and MDA is heated at 200° to give a hard polymer.

EXAMPLE 51

A sample of 2-m-aminoanilino-4-N-cyano-p-toluidino-6-N-morpholino-s-triazine is homopolymerized at 225° to a hard polymer.

EXAMPLE 52

A mixture of 2-N-cyanoanilino- 4-N-imidazolyl-6-mercapto-s-triazine and bis-phenol A in a mole ratio of 9:2 respectively is polymerized at 200° to a hard polymer.

EXAMPLE 53

A sample of 2-N-cyanoanilino-4-N-imidazolyl-6-mercapto-s-triazine is homopolymerized at 200° to a hard material.

EXAMPLE 54

A sample of 2-N-cyanomethylamino-4,6-dihydroxy-s-triazine is homopolymerized at 225° to a hard material.

EXAMPLE 55

A sample of 2-N-cyanoanilino-4-m-mercaptoanilino-6-phenyl-s-triazine is homopolymerized at 200° to a hard material.

EXAMPLE 56

A sample of 2-N-cyanomethylamino-4-(2',4'-dihydroxyphenyl)-6-phenyl-s-triazine is homopolymerized at 200° to a hard material.

EXAMPLE 57

Stability of TNCT at 200°

A solution at 5.0g of TNCT in 45 ml of nitrobenzene was heated at 200° for 19 hours. After cooling the solution was diluted with an equal volume of toluene followed by the addition of twice the nitrobenzene-toluene volume of heptane. The precipitated solid was filtered, washed with heptane and dried to give 4.4g of TNCT; mixed m.p. with analytically pure TNCT, no depression. Thus, 88% of the TNCT was recovered.

EXAMPLE 58

TNCT and MDA - Evidence of Copolymerization

A mixture of 2.15g (0.005 mole) of TNCT and 1.40g (0.0075 mole) of MDA was slowly heated. At 100°–150° the mixture melted and polymerized at 170°. After further heating at 200° for 1 hour, the polymer was cooled and pulverized to a fine powder. The powder was extracted with 50 ml of boiling acetone. The acetone extract was stripped to dryness leaving a few mgs. of a solid, m.p. 105°–120°. This melting point is above that for pure MDA (m.p. 97°). MDA is acetone soluble and its absence in the acetone extract indicates that it is incorporated into the polymer.

EXAMPLE 59

TNCT and Bis-Phenol A - Evidence of Copolymerization

A mixture of 2.15g (0.005 mole) of TNCT and 1.71g (0.0075 mole) of bis-phenol A melted at 140°–165°. After heating at 200° for 1 hour the polymer was cooled to room temperature. A 2.0g sample of the polymer was pulverized to a powder and extracted with 50 ml of boiling acetone. The acetone extract was stripped to dryness leaving 0.65g of a yellow solid m.p. 100–120 dec; not soluble in 10% aq. NaOH. Bis-phenol A melts at 148°–151° and is soluble in aq. 10% NaOH. Thus, the acetone soluble material is not bis-phenol A. Bis-phenol A is soluble in acetone and its absence in the extract indicates that it is incorporated into the polymer.

The foregoing Examples establish that the triazine cyanamides of formula II form useful polymers with phenols, thiols and amines of formula III. This is surprising in the light of the discosure in U.S. Pat. No. 3,642,725 issued Feb. 15, 1972. This patent discloses polymeric products characterized by a plurality of recurring polytriazine moieties prepared by a process of homopolymerizing a polyfunctional cyanamide of a secondary amine. The patent does not disclose triazine cyanamides; however, it employs phenols and thiols as catalysts which are not incorporated into the polymeric product. The polymers of this invention, apparently, due to the different reactivity of triazine cyanamides as compared with the cyanamides disclosed in the patent, are polymers of triazine cyanamides and phenols, thiols and/or amines.

What is claimed is:

1. A polymer represented by the following formula

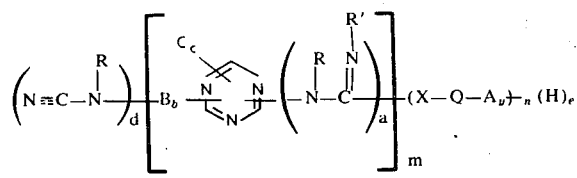

wherein
$y = 0, 1, 2, 3$ or $4$
$a = 1, 2$ or $3$
$b = 0, 1$ or $2$
$c = 0, 1$ or $2$
$a+b+c = 3$
$m = 1$ to $100$
$n = 0$ to $100$, provided that when $b+c=0$, $n$ is a positive number and when $n$ is 0, at least one of C and B must be "$X-Q-A_y$"
$X = $ nil, $-O-$, $-S-$, $-NH-$, $-NR-$, H
$A = -O-$, $-S-$, $-NH-$, $-NR-$
$Q = $ an organic radical, e.g., arylene, alkyl and/or heterocyclic
$R = $ alkyl, aryl or heterocyclic
$R' = $ a recurring amidinotriazinyl moiety (s-triazine—NR—C(=N—)—) derived from the triazine starting material) or H
$B = -X-Q-A_y-$, X or $-NR-C(=N-)-$
$C = -X-Q-A_y-$, X, XH or $-NR-C(=N-)-$
$d = $ number of unreacted R—N—CN groups
$e = $ number of unreacted hydrogen containing functional groups 2. A polymer according to claim 1 wherein $n$ is greater than 0.

3. A polymer according to claim 1 wherein X and A are NH.

4. A polymer according to claim 1 wherein X and A are NR.

5. A polymer according to claim 1 wherein X and A are O and Q is arylene or heterocyclic.

6. A polymer according to claim 1 wherein X and A are S.

7. A polymer according to claim 1 wherein X and A are O and NH.

8. A polymer according to claim 1 wherein X and A are O and S.

9. A polymer according to claim 1 wherein X and A are NH and S.

10. A polymer according to claim 1 wherein R is $C_6H_5-$.

11. A polymer according to claim 1 wherein R is alkyl.

12. A polymer according to claim 1 wherein R is $C_6H_5-$, $a$ is 3, Q is $-C_6H_4-$, X is H and $y$ is 1.

13. A polymer according to claim 12 wherein A is NH.

14. A polymer according to claim 12 wherein A is O.

15. A polymer according to claim 12 wherein A is S.

16. A polymer according to claim 1 wherein R is $C_6H_5-$, X and A are NH and $a$ is 3.

17. A polymer according to claim 16 wherein Q is $-C_6H_4-$(meta) and $y$ is 1.

18. A polymer according to claim 16 wherein Q is (para)$-C_6H_4-CH_2-C_6H_4-$(para) and $y$ is 1.

19. A polymer according to claim 16 wherein Q is (para)$-C_6H_4-O-C_6H_4-$(para) and $y$ is 1.

20. A polymer according to claim 16 wherein Q is $(CH_2)_6$ and $y$ is 1.

21. A polymer according to claim 16 wherein Q is $-C_6H_4-CH_2-C_6H_3-C_6H_4-$ and $y$ is 2.

22. A polymer according to claim 16 wherein Q is

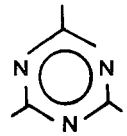

and $y$ is 1.

23. A polymer according to claim 16 wherein Q is

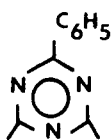

and $y$ is 1.

24. A polymer according to claim 1 wherein R is $C_6H_5$—, X and A are 0 and $a$ is 3.

25. A polymer according to claim 24 wherein q is (para)—$C_6H_4$—$C(CH_3)_2$—$C_6H_4$—(para) and $y$ is 1.

26. A polymer according to claim 24 wherein Q is (meta)—$C_6H_4$— and $y$ is 1.

27. A polymer according to claim 24 wherein Q is

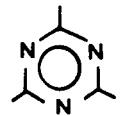

and $y$ is 2.

28. A polymer according to claim 1 wherein R is $C_6H_5$—, X and A are S and $a$ is 3.

29. A polymer according to claim 28 wherein Q is —$(CH_2)_4$— and $y$ is 1.

30. A polymer according to claim 28 wherein Q is

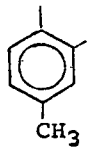

and $y$ is 1.

31. A polymer according to claim 1 wherein C is —$N(C_6H_5)_2$, R is $C_6H_5$— and $a$ is 2.

32. A polymer according to claim 31 wherein X and A are NH, Y is 1 and Q is (para)—$C_6H_4$—$CH_2$—$C_6H_4$—(para).

33. A polymer according to claim 31 wherein X and A are NH, Q is (para)—$C_6H_4$—O—$C_6H_4$—para and $y$ is 1.

34. A polymer according to claim 31 wherein X and A are NH, Q is $C_6H_4$—$CH_2$—$C_6H_3$—$CH_2$—$C_6H_4$— and $y$ is 2.

35. A polymer according to claim 1 wherein R is $C_6H_5$—, $a$ is 1, C is B is —X—Q—$A_y$— and b=c=1; X and Y are NH; Q is m—$C_6H_4$— and $y$ is 1.

36. A polymer obtained by postcuring the polymer of claim 1 from 25° – 350° for 1 hour to 7 days.

37. A polymer represented by the formula

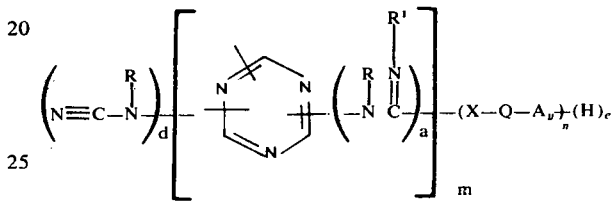

wherein
$y = 1$,
$a = 3$,
$m = 1$ to 100,
$n = 1$ to 100,
X = —NH—,
A = —NH—,
Q = (para)—$C_6H_4$—$CH_2$—$C_6H_4$—(para),
R = phenyl,
$R^1$ = a recurring amidino-triazinyl moiety (s-triazine-NR—C(=N—)—) derived from the triazine starting material) or H,
d = number of unreacted R—N—CN groups, and
e = number of unreacted hydrogen-containing functional groups.

* * * * *